(12) United States Patent
Grutke et al.

(10) Patent No.: US 7,015,269 B1
(45) Date of Patent: Mar. 21, 2006

(54) BIODEGRADABLE, THERMOPLASTIC MOLDING MATERIALS

(75) Inventors: Stefan Grutke, Neustadt (DE); Christof Mehler, Ludwigshafen (DE); Uwe Witt, Mutterstadt (DE); Motonori Yamamoto, Mannheim (DE); Gabriel Skupin, Speyer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 90 days.

(21) Appl. No.: 10/088,407

(22) PCT Filed: Sep. 12, 2000

(86) PCT No.: PCT/EP00/08913

§ 371 (c)(1),
(2), (4) Date: Mar. 19, 2002

(87) PCT Pub. No.: WO01/19909

PCT Pub. Date: Mar. 22, 2001

(30) Foreign Application Priority Data

Sep. 13, 1999 (DE) .................... 199 43 774

(51) Int. Cl.
*C08K 3/34* (2006.01)
*C08K 9/04* (2006.01)

(52) U.S. Cl. .............. 524/445; 524/447; 524/186; 524/206

(58) Field of Classification Search ........... 524/445, 524/447, 186
See application file for complete search history.

(56) References Cited

U.S. PATENT DOCUMENTS

| 4,477,654 A | 10/1984 | Holmes et al. .......... 528/361 |
|---|---|---|
| 4,894,411 A | 1/1990 | Okada et al. .......... 524/710 |
| 5,827,905 A | 10/1998 | Grigat et al. .......... 523/124 |
| 6,018,004 A * | 1/2000 | Warzelhan et al. ...... 525/440 |
| 6,368,710 B1 * | 4/2002 | Hayes .................. 428/364 |
| 6,395,386 B1 * | 5/2002 | Bagrodia et al. ........ 428/323 |
| 6,492,452 B1 * | 12/2002 | Topolkaraev et al. .... 524/445 |
| 6,608,167 B1 * | 8/2003 | Hayes et al. ........... 528/271 |
| 6,787,245 B1 * | 9/2004 | Hayes .................. 428/480 |
| 6,808,795 B1 * | 10/2004 | Noda et al. ............ 428/221 |
| 2002/0028857 A1 * | 3/2002 | Holy .................... 523/124 |

FOREIGN PATENT DOCUMENTS

| DE | 198 21 477 | 11/1899 |
|---|---|---|
| EP | 565 235 | 10/1993 |
| JP | 00 070 696 | 3/2000 |
| WO | WO 92/13019 | 8/1992 |

OTHER PUBLICATIONS

Theng "Formation and Properties of Clay-Polymer Complexes" Development in Soil Sciences vol. 9 (1979).
Tokiwa e al. "Hydrolysis of polyesters by lipases" Nature vol. 270 (1977) pp. 76-78.

* cited by examiner

*Primary Examiner*—Tae H. Yoon
(74) *Attorney, Agent, or Firm*—Novak Druce Deluca & Quigg, LLP

(57) ABSTRACT

A biodegradable thermoplastic molding composition comprises
 a) at least one biodegradable thermoplastic copolyester, and
 b) based on the total weight of the thermoplastic molding composition, from 0.01 to 15% by weight of at least one hydrophobicized phyllosilicate.

A process for preparing the molding composition is described, as is a process for producing moldings, films or fibers from the molding composition.

13 Claims, No Drawings

BIODEGRADABLE, THERMOPLASTIC MOLDING MATERIALS

The present invention relates to a biodegradable thermoplastic molding composition comprising
a) at least one biodegradable thermoplastic copolyester, and
b) from 0.01 to 15% by weight, based on the total weight of the thermoplastic molding composition, of at least one hydrophobicized phyllosilicate, to a process for preparing the molding composition and to moldings, films and fibers made from the molding composition.

Polymers which are biodegradable, i.e. decompose when exposed to the environment within an appropriate and demonstrable period of time, have been known for some time. This degradation is generally hydrolytic and/or oxidative, but predominantly due to the action of microorganisms, such as bacteria, yeasts, fungi and algae. Y. Tokiba und T. Suzuki (Nature, Vol. 270, pp. 76–78, 1977) describe enzymatic degradation of aliphatic polyesters, for example of polyesters based on succinic acid and on aliphatic diols.

A disadvantage of biodegradable polymers of this type is that their mechanical properties or performance characteristics are usually inadequate. Indeed, in many cases these properties tend to vary in opposite directions. For example, polyamides are simple and inexpensive to prepare and in some cases have excellent mechanical properties and performance characteristics, but have only moderate biodegradability. In contrast, aliphatic polyesters generally have very good biodegradability but are frequently difficult to process.

The literature describes experiments intended to overcome this dilemma by modifying the polyesters chemically. For example, WO 92-13019 disclosed copolyesters based on predominantly aromatic dicarboxylic acids and on aliphatic diols. To improve their biodegradability, these contain up to 2.5 mol % of metal salts of 5-sulfoisophthalic acid or short-chain ether diol segments.

EP-A 565235 describes aliphatic copolyesters modified by incorporating [—NH—C(O)O—] groups ("urethane units"). However, these copolyesters again show a biodegradability which is relatively slow for aliphatic copolyesters.

Witt et al. (handout in connection with a poster at the International Workshop of the Royal Institute of Technology, Stockholm, Sweden, Apr. 21–23, 1994) describe biodegradable copolyesters based on 1,3-propanediol, terephthalic ester and adipic or sebacic acid.

A disadvantage of these copolyesters is that moldings prepared from them, in particular films, have inadequate mechanical properties.

The earlier German patent publication P 4440858.7 (O.Z. 0050/45364) recommends copolyesters which comprise compounds containing sulfonate groups and comprise components having at least three groups capable of ester formation, in amounts of up to 5 mol %. The use of these components permits controlled improvements in properties, but a suitable tailored mixing specification has to be drawn up for every application.

DE-A-195 47 636 describes another approach to solving these problems, disclosing thermoplastic molding compositions made from biodegradable polymers whose biodegradability and mechanical properties and, respectively, processability are to be achieved by a high degree of filling with naturally occurring fillers. The biodegradable polymers used are exclusively polyesteramides with a high amide content (greater than 50% by weight). The improvement in mechanical properties is achieved by using wood flour and, respectively, kaolin as filler and is determined by measuring the tensile modulus of elasticity. To achieve this significant improvement in the tensile modulus of elasticity, filler levels of from 40 to 50% by weight are needed, but it can be demonstrated that high filler levels of this type impair other mechanical properties, for example causing embrittlement, and processability is also impaired as a result of lower melt flow. In addition, high filler levels, while giving the desired improvement in biodegradability, at the same time cause an undesirable shortening of the service life of products produced with these molding compositions, and in practice it is therefore difficult to use products of this type.

It is known that the physicochemical properties of polymers can be improved by adding clay minerals (cf. H. K. G. Theng in "Information and Properties of Clay-Polymer Complexes", Elsevier, Amsterdam, 1979). It is known, for example, from DE-A-38 08 623, Journal of Material Science, 1996, 31, pp. 3389–3396, and from DE 198 21 477.4, that adding phyllosilicates can improve the stiffness properties of polymers such as polyamides, polystyrenes and polyketones. However, this reduces the toughness of the resultant material, as seen, for example, in their lower elongation at break.

It is an object of the present invention to provide molding compositions based on copolyesters with high biodegradability, in particular enzymatic degradability, and having improved mechanical properties and performance characteristics, for a wide application sector. In particular, the properties important for a variety of application sectors, such as yield stress and processability, are to be improved without any adverse effect on other properties, e.g. toughness and biodegradability.

We have found that this object is achieved, surprisingly, by molding compositions based on biodegradable thermoplastic copolyesters which comprise, based on the total weight of the thermoplastic molding composition, from 0.01 to 15% by weight of hydrophobicized phyllosilicates. These molding compositions show a marked improvement in tensile modulus and in processing properties, without any adverse effect on important other properties, in particular toughness, biodegradability and the service life of the products produced from the molding compositions, in their applications. The increase found in the tensile modulus for the novel composite materials here is in particular advantageous for their use as a material for film production. The novel molding compositions are moreover unlike molding compositions based on copolyesters with conventional fillers in having better processability and also being suitable for use in injection molding.

The present invention therefore provides the biodegradable thermoplastic molding composition defined at the outset.

Suitable novel molding compositions preferably comprise:
from 99.99 to 30% by weight of copolyester,
from 0.01 to 15% by weight of hydrophobicized phyllosilicate,
from 0 to 50% by weight of other fillers, in particular fibrous fillers, and
from 0 to 5% by weight of auxiliaries.

For the purposes of the present invention, copolyesters are polymers which have ester bonds in their polymer skeleton and, when the total of all of the polymer molecules is considered, contain at least two types of repeat units, preferably:

polyesters which contain a hydroxycarboxylic acid component and at least one other hydroxycarboxylic acid component or at least one other component copolymerizable therewith, polyesters which contain, incorporated into the polymer, a dicarboxylic acid component, a diol component and, if desired, at least one other component copolymerizable with the abovementioned components, where the dicarboxylic acid component comprises at least two different dicarboxylic acids and/or the diol component comprises at least two different diols, and/or the other component is used concomitantly, or mixtures made from at least two different polyesters selected from the group consisting of homo- and copolyesters.

The starting material for preparing the copolyesters may be the acid itself, its ester-forming derivatives or mixtures of the acid and its ester-forming derivatives. The copolyesters may contain subordinate amounts of tri- and polyol components, diamine components and/or amino alcohol components.

For the purposes of the present invention, thermoplastic copolyesters are copolyesters which when they receive thermal and/or mechanical energy soften or melt without substantial decomposition. A suitable measure of decomposition on softening and melting is molecular weight degradation. The copolyesters of the novel molding compositions can preferably be softened or melted without more than 20% molecular weight degradation, preferably without more than 15% and particularly preferably without more than 10%. For the purposes of the present invention, the term degradable preferably means degradable by microorganisms.

Hydroxycarboxylic acid components suitable according to the invention are α-, β-, γ-, δ- or ε-hydroxycarboxylic acids, in particular lactic acid, glycolic acid or ε-hydroxycarboxylic acid, which may be used in the form of their cyclic esters or lactones, in particular β-propiolactone, γ-butyrolactone, δ-valerolactone and particularly ε-caprolactone, and also the di- and oligomers of the abovementioned carboxylic acids, in particular glycolide and dilactide.

Examples of biodegradable thermoplastic copolyesters are aliphatic copolyesters. These include copolymers of at least two aliphatic hydroxycarboxylic acids or lactones and block copolymers of various hydroxycarboxylic acids or lactones or mixtures of these.

Aliphatic copolyesters include copolymers or block copolymers based on lactic acid and on other monomers. Linear polylactides are mostly used, but it is also possible to use branched lactic acid polymers. Examples of branching agents which may be used are polyfunctional acids or alcohols. Mention may be made of polylactides which are essentially obtainable from lactic acid or from its $C_1$–$C_4$-alkyl esters or mixtures of these, or else from at least one aliphatic $C_4$–$C_{10}$ dicarboxylic acid and from at least one $C_3$–$C_{10}$ alkanol having from three to five hydroxyl groups.

Other examples of biodegradable thermoplastic copolyesters are copolymers of 3-hydroxybutanoic acid or mixtures thereof with 4-hydroxybutanoic acid and/or with 3-hydroxyvaleric acid, in particular with up to 30% by weight, preferably up to 20% by weight, of the last-named acid. Copolymers of polyhydroxybutanoic acid can be prepared by microbial methods. Processes for the preparation starting from a variety of bacteria and fungi can be found in Nachr. Chem Tech. Lab. 39, 1112–1124 (1991) and WO 96/09402, for example.

Other units present in these aliphatic copolyesters may be diols and/or isocyanates. The aliphatic copolyesters may moreover contain units which derive from tri- or polyfunctional compounds, for example from epoxides, from acids or from triols. The latter units may be present singly in the aliphatic copolyesters, or they may be present in numbers of 2 or more, or else together with the diols and/or isocyanates.

Processes for preparing aliphatic copolyesters are known to the skilled worker. The aliphatic copolyesters generally have molar masses (number average) of from 10,000 to 100,000 g/mol.

In a preferred embodiment the hydroxycarboxylic acid used comprises glycolic acid, D-, L-, or D,L-lactic acid, 6-hydroxyhexanoic acid, cyclic derivatives of these, such as glycolide (1,4-dioxane-2,5-dione), D-, or L-dilactide (3,6-dimethyl-1,4-dioxane-2,5-dione), p-hydroxybenzoic acid, or else oligomers or polymers of these, such as 3-polyhydroxybutyric acid, polyhydroxyvaleric acid, polylactide (such as EcoPLA® (obtainable from Cargill), or else a mixture made from 3-polyhydroxybutyric acid and polyhydroxyvaleric acid (the latter being obtainable as Biopol® from Zeneca), and for preparing partly aromatic polyesters particularly preferably the low-molecular-weight and cyclic derivatives thereof.

Preferred copolyesters preferably contain at least one dicarboxylic acid or an ester-forming derivative or a mixture of these (component A), at least one diol component (component B) and, if desired, tri- and polyols, di- and polyamines, amino alcohols, hydroxycarboxylic acids, aminocarboxylic acids, tri- and polycarboxylic acids, bisoxazolines and isocyanates (component C).

Preferred copolyesters include copolyesters which contain at least three components selected from the group consisting of components A and B and, if desired, one or more other components C, where component A comprises at least one dicarboxylic acid or an ester-forming derivative or a mixture of these, component B comprises at least one diol component and component C comprises tri- and polyols, di- and polyamines, amino alcohols, hydroxycarboxylic acids, aminocarboxylic acids, tri- and polycarboxylic acids, bisoxazolines and isocyanates.

Aliphatic copolyesters which have been built up from aliphatic or cycloaliphatic dicarboxylic acids or from mixtures of these and from aliphatic or cycloaliphatic diols or mixtures of these are suitable, in the form of either random copolymers or block copolymers.

Suitable aliphatic dicarboxylic acids generally have from 2 to 10 carbon atoms, preferably from 4 to 6 carbon atoms. They may be linear or branched. For the purposes of the present invention, cycloaliphatic dicarboxylic acids which may be used are generally those having from 7 to 10 carbon atoms, in particular 8 carbon atoms. However, the principle also applies to the use of dicarboxylic acids having a larger number of carbon atoms, for example having up to 30 carbon atoms.

Examples of these are: malonic acid, succinic acid, glutaric acid, adipic acid, pimelic acid, azelaic acid, sebacic acid, fumaric acid, 2,2-dimethylglutaric acid, suberic acid, 1,3-cyclopentanedicarboxylic acid, 1,4-cyclohexanedicarboxylic acid, 1,3-cyclohexanedicarboxylic acid, diglycolic acid, itaconic acid, maleic acid, and 2,5-norbornanedicarboxylic acid, and among these preference is given to adipic acid.

Examples of possible aliphatic copolyesters are those described in WO 94/14870, in particular aliphatic copolyesters made from succinic acid, its diesters or mixtures of these with other aliphatic acids and, respectively, diesters, for example glutaric acid, and butanediol, or mixtures made from this diol with ethylene glycol, propanediol or hexanediol, or mixtures of these.

Aliphatic copolyesters of this type generally have molar masses (number average) of from 10,000 to 100,000 g/mol.

The aliphatic copolyesters may also be random or block copolyesters which contain other monomers. The proportion of the other monomers is generally up to 10% by weight. Preferred comonomers are hydroxycarboxylic acids or lactones, or mixtures of these.

In preparing the aliphatic copolyesters it is, of course, also possible to use mixtures made from two or more comonomers and/or from other units, for example from epoxides or from polyfunctional aliphatic or aromatic acids, or from polyfunctional alcohols.

Preferred aromatic dicarboxylic acids generally have from 8 to 12 carbon atoms, preferably 8 carbon atoms. Examples of suitable acids are naphthalenedicarboxylic acids, such as 2,6-naphthalenedicarboxylic acid and 1,5-naphthalenedicarboxylic acid, and in particular benzenedicarboxylic acids, such as terephthalic acid, phthalic acid, and isophthalic acid, preferably terephthalic acid and isophthalic acid. Terephthalic acid is particularly preferred.

Mention should be made in particular of the following ester-forming derivatives of the abovementioned dicarboxylic acids which may also be used: di-$C_1$–$C_6$-alkyl esters, such as dimethyl, diethyl, di-n-propyl, diisopropyl, di-n-butyl, diisobutyl, di-t-butyl, di-n-pentyl, diisopentyl or di-n-hexyl esters. It is also possible to use anhydrides of these dicarboxylic acids.

The dicarboxylic acids or their ester-forming derivatives here may be used singly or as a mixture made from two or more of these.

Possible diol components (component B) are aromatic diols, such as naphthalenediols, in particular 1,4-, 1,6-, 1,7-, 2,6- and 2,7-dihydroxynaphthalenes, preferably 1,5-dihydroxynaphthalene and 2,6-dihydroxynapthalene, dihydroxybenzenes, such as pyrocatechol, resorcinol and hydroquinone, in particular resorcinol and hydroquinone, and also bisphenols, in particular bisphenol A, and biphenyldiols, in particular o,o'-biphenol. Preferred diol components (component B) are aliphatic diols, such as branched or linear alkanediols having from 2 to 12 carbon atoms, preferably from 4 to 8 carbon atoms, and cycloalkanediols having from 5 to 10 carbon atoms.

Examples of suitable alkanediols are ethylene glycol, 1,2-propanediol, 1,3-propanediol, 1,2-butanediol, 1,4-butanediol, 1,5-pentanediol, 2,4-dimethyl-2-ethyl-1,3-hexanediol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, and in particular ethylene glycol, 1,3-propanediol, 1,4-butanediol and 2,2-dimethyl-1,3-propanediol (neopentyl glycol); cyclopentanediol, 1,4-cyclohexanediol, 1,2-cyclohexanedimethanol, 1,3-cyclohexanedimethanol, 1,4-cyclohexanedimethanol and 2,2,4,4-tetramethyl-1,3-cyclobutanediol. It is also possible to use mixtures of different alkanediols. 1,4-butanediol is preferred.

Instead of the abovementioned diol components, or preferably in addition to the abovementioned diol components, use may also be made of dihydroxy compounds containing ether functions, preferably dihydroxy compounds containing ether functions and having the formula I $$HO-[(CH_2)_n-O]_m-H \quad (I),$$

where n is an integer from 2 to 12, preferably 2, 3, 4 or 6, and m is an integer from 2 to 250. Dihydroxy compounds which contain ether functions and whose use is preferred are diethylene glycol, triethylene glycol, polyethylene glycol, polypropylene glycol and polytetrahydrofuran (polyTHF), and particular preference is given to the use of diethylene glycol, triethylene glycol or polyethylene glycol. Mixtures of these are also suitable, as are compounds which have different variables n (see formula I), for example polyethylene glycol which contains propylene units (n=3) or vice versa. Those compounds may be obtained, for example, by polymerization methods known per se, e.g. by polymerizing-on ethylene oxide and propylene oxide in alternation. Particular preference is given to a polymer based on polyethylene glycol with different variables n and where units formed from ethylene oxide predominate. The molar mass ($M_n$) of the polyethylene glycol is generally selected to be from 250 to 8000 g/mol, preferably from 600 to 3000 g/mol.

An example of a diol component (component B) used in a preferred embodiment for preparing the polyesters is from 15 to 99,8 mol %, preferably from 60 to 99.5 mol %, of the diols, and from 0.2 to 85 mol %, preferably from 0.5 to 30 mol %, of the abovementioned dihydroxy compounds containing ether groups.

Depending on whether an excess of acid end groups or OH end groups is desired, an excess of either component A or of component B may be used. In a preferred embodiment, the molar ratio between the component A and the component B used may be from 0.4:1 to 1.5:1, preferably from 0.6:1 to 1.1:1.

It is advantageous to use partly aromatic copolyesters. These preferably contain, in their component A or B, based on the respective components, from 5 to 95 mol %, in particular from 20 to 70 mol %, of aromatic compounds.

Particularly preferred copolyesters for the novel molding compositions are therefore those which contain, as component A, from 30 to 95 mol % of at least one aliphatic dicarboxylic acid and from 5 to 70 mol % of at least one aromatic dicarboxylic acid, or ester-forming derivatives of these dicarboxylic acids, or mixtures of the dicarboxylic acids and their ester-forming derivatives, and, as component B, preferably at least one diol component selected from the group consisting of $C_2$–$C_{12}$ alkanediols and $C_5$–$C_{10}$ cycloalkanediols and mixtures of these.

It is advantageous for mechanical properties, in particular when preparing film materials, if component A contains at least 20 mol %, in particular at least 30 mol %, of at least one aromatic dicarboxylic acid or of ester-forming derivatives thereof.

In a particularly preferred embodiment, component A comprises from 30 to 70 mol %, in particular from 40 to 60 mol %, of an aliphatic dicarboxylic acid and from 30 to 70 mol %, in particular from 40 to 60 mol %, of an aromatic dicarboxylic acid or of ester-forming derivatives thereof.

Preferred aliphatic dicarboxylic acids in partly aromatic copolyesters of this type are malonic acid, succinic acid, glutaric acid, adipic acid, pimelic acid, suberic acid, azelaic acid and sebacic acid, in particular succinic acid, adipic acid and sebacic acid, and particularly preferably adipic acid.

Preferred aromatic dicarboxylic acids in partly aromatic copolyesters of this type are benzenedicarboxylic acids.

The copolyesters of the novel molding compositions preferably contain, as component A,
    from 5 to 70 mol %, preferably from 20 to 65 mol % and particularly preferably from 40 to 60 mol %, of at least one benzenedicarboxylic acid, in particular terephthalic acid, or of an ester-forming derivative of these carboxylic acids, in particular dialkyl terephthalates, particularly preferably dimethyl terephthalate, or a mixture of these, and from 30 to 95 mol %, preferably from 35 to 80 mol % and particularly preferably from 40 to 60 mol %, of at least one dicarboxylic acid selected from the group consisting of malonic, succinic and adipic acids, in particular adipic acid, and of ester-forming derivatives of these carboxylic acids, and mixtures of these.

The preparation of the partly aromatic copolyesters is known per se or may take place by methods known per se.

The preferred partly aromatic copolyesters have the characteristic feature of a molar mass (Mn) of from 5000 to 50,000 g/mol, in particular from 10,000 to 40,000 g/mol, with a viscosity number of from 50 to 400 g/ml, in particular from 100 to 300 g/ml (measured in o-dichlorobenzene/phenol; weight ratio 50/50, at a concentration of 0.5% by weight of polymer and at 25° C.), and with a melting point of from 60 to 170° C., preferably from 80 to 150° C.

For the purposes of the present invention, partly aromatic copolyesters include polyester derivatives, such as polyetheresters, polyesteramides and polyetheresteramides. Suitable biodegradable partly aromatic copolyesters include non-chain-extended linear polyesters (WO 92/09654). Preference is given to chain-extended and/or branched partly aromatic copolyesters. The latter are known from the publications mentioned at the outset, WO 96/15173-15176, 21689-21692, 25446, 25448 or WO 98/12242, which are expressly incorporated herein by way of reference. It is also possible to use mixtures of different partly aromatic polyesters, or blends of partly aromatic polyesters or of copolyesters with starch or modified starch, cellulose or modified cellulose, copolymers or block copolymers based on lactic acid and polyhydroxyalkanoates, or copolymers or block copolymers based on other hydroxycarboxylic acids which differ from lactic acid.

Besides components A and B, the polyesters on which the novel compositions are based or, respectively, which may be used in the novel process, may contain other components.

The novel molding compositions may comprise one or more components C selected from the group consisting of C1) at least one hydroxycarboxylic acid or lactone of the formula IIa or IIb

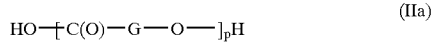
(IIa)

(IIb)

where p is an integer from 1 to 1500 and r is an integer from 1 to 4, and G is a radical selected from the group consisting of phenylene, —(CH$_2$)$_q$—, where q is an integer from 1 to 5, —C(R)H— and —C(R)HCH$_2$, where R is methyl or ethyl, C2) at least one amino C$_2$–C$_{12}$ alkanol or at least one amino C$_5$–C$_{10}$ cycloalkanol or a mixture of these, C3) at least one diamino C$_1$–C$_8$ alkane, C4) at least one 2,2'-bisoxazoline of the formula III

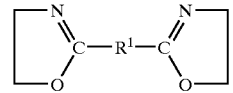
(III)

where R$^1$ is a single bond, (CH$_2$)$_z$-alkylene, where z=2, 3 or 4, or phenylene, and C5) at least one aminocarboxylic acid selected from the group consisting of naturally occurring amino acids, polyamides with a molar mass of not more than 18,000 g/mol and obtainable by polycondensing a dicarboxylic acid having from 4 to 6 carbon atoms and a diamine having from 4 to 10 carbon atoms, and compounds of the formulae IVa and IVb,

(IVa)

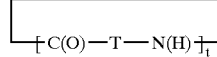
(IVb)

where s is an integer from 1 to 1500 and t is an integer from 1 to 4, and T is a radical selected from the group consisting of phenylene, —(CH$_2$)$_n$—, where n is an integer from 1 to 12, —C(R$^2$)H— and —C(R$^2$)HCH$_2$, where R$^2$ is methyl or ethyl, and polyoxazolines having the repeat unit V,

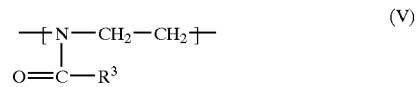
(V)

where R$^3$ is hydrogen, C$_1$–C$_6$-alkyl, C$_5$–C$_8$-Cycloalkyl, tetrahydrofuryl, or unsubstituted phenyl or phenyl having up to three C$_1$–C$_4$-alkyl substituents, of from the group consisting of mixtures made from C1) to C5).

In a preferred embodiment the hydroxycarboxylic acid C1) used comprises: glycolic acid, D-, L-, D,L-lactic acid, 6-hydroxyhexanoic acid, cyclic derivatives of these, such as glycolide (1,4-dioxane-2,5-dione), D-, L-dilactide (3,6-dimethyl-1,4-dioxane-2,5-dione), p-hydroxybenzoic acid, or else oligomers and polymers of these, such as 3-polyhydroxybutyric acid, polyhydroxyvaleric acid, polylactide (such as EcoPLA® (obtainable from Cargill), or else a mixture made from 3-polyhydroxybutyric acid and polyhydroxyvaleric acid (the latter being obtainable as Biopol® from Zeneca), or for preparing partly aromatic polyesters particularly preferably the low-molecular-weight and cyclic derivatives thereof.

Examples of the amounts of the hydroxycarboxylic acids used, based on the amount of A and B, are from 0.01 to 50% by weight, preferably from 0.1 to 40% by weight.

The amino C$_2$–C$_{12}$ alkanol or amino C$_5$–C$_{10}$ cycloalkanol used (component C2) (and 4-aminomethylcyclohexanemethanol should also be included here) preferably comprises amino C$_2$–C$_6$ alkanols, such as 2-aminoethanol, 3-aminopropanol, 4-aminobutanol, 5-aminopentanol or 6-aminohexanol, or else amino C$_5$–C$_6$ cycloalkanols, such as aminocyclopentanol or aminocyclohexanol, or a mixture of these.

The diamino $C_1$–$C_8$ alkane (component C3) used preferably comprises diamino $C_4$–$C_6$ alkanes, such as 1,4-diaminobutane, 1,5-diaminopentane or 1,6-diaminohexane (hexamethylenediamine, HMD).

In a preferred embodiment for preparing the partly aromatic polyesters, use may be made of from 0.5 to 99.5 mol %, preferably from 70 to 98.0 mol %, of the diol component B, from 0.5 to 99.5 mol %, preferably from 0.5 to 50 mol %, of C2 and from 0 to 50 mol %, preferably from 0 to 35 mol %, of C3, based on the molar amount of B, C2 and C3.

The 2,2'-bisoxazolines C4 of the formula III are generally obtainable by the process of Angew. Chem. Int. Edit., Vol. 11 (1972), pp. 287–288. Particularly preferred bisoxazolines are those where $R^1$ is a single bond, $(CH_2)_q$-alkylene, where q=2,3 or 4, for example methylene, ethane-1,2-diyl, propane-1,3-diyl or propane-1,2-diyl, or phenylene. Particularly preferred bisoxazolines are 2,2'-bis(2-oxazoline), bis(2-oxazolinyl)methane, 1,2-bis(2-oxazolinyl)ethane, 1,3-bis(2-oxazolinyl)propane and 1,4-bis(2-oxazolinyl)butane and in particular 1,4-bis(2-oxazolinyl)benzene, 1,2-bis(2-oxazolinyl)benzene and 1,3-bis(2-oxazolinyl)benzene.

The partly aromatic polyesters may, for example, be prepared by using from 70 to 98 mol % of component B, up to 30 mol % of C2 and from 0.5 to 30 mol % of C3 and from 0.5 to 30 mol % of C4, based in each case on the total of the molar amounts of components B, C2, C3 and C4. In another preferred embodiment, the amount of component C4 used, based on the total weight of A and B, is from 0.1 to 5% by weight, preferably from 0.2 to 4% by weight.

Naturally occurring aminocarboxylic acids may be used as component C5. These include valine, leucine, isoleucine, threonine, methionine, phenylalanine, tryptophan, lysine, alanine, arginine, aspartamic acid, cysteine, glutamic acid, glycine, histidine, proline, serine, tyrosine, asparagine and glutamine.

Preferred aminocarboxylic acids of the formulae IVa and IVb are those where s is an integer from 1 to 1000 and t is an integer from 1 to 4, preferably 1 or 2, and T has been selected from the group consisting of phenylene and —$(CH_2)_n$—, where n is 1, 5 or 12.

C5 may also be a polyoxazoline of the formula V, or else a mixture of various aminocarboxylic acids and/or polyoxazolines.

In a preferred embodiment, use may be made of from 0.01 to 50% by weight, preferably from 0.1 to 40% by weight, of C5, based on the total amount of components A and B.

Other components which may be used in preparing the partly aromatic polyesters include compounds which contain at least three groups capable of ester formation.

These compounds preferably contain from 3 to 10 functional groups capable of ester formation. Particularly preferred compounds of this type have from 3 to 6 functional groups of this type in their molecule, in particular from 3 to 6 hydroxyl groups and/or carboxyl groups. Examples of these are:

tartaric acid, citric acid, malic acid;

triols and/or polyols, such as glycerol, trimethylolethane, trimethylolpropane, trimethylolbutane, pentaerythritol, ditrimethylolpropane, sorbitol, erythritol and 1,3,5-trihydroxybenzene;

polyethertriols;

trimesic acid;

trimellitic acid, trimellitic anhydride;

pyromellitic acid, pyromellitic dianhydride and hydroxyisophthalic acid.

The amount used of compounds which contain at least three groups capable of ester formation is generally from 0.01 to 5 mol %, preferably from 0.05 to 4 mol %, based on component A.

Other suitable components C are isocyanates. Use may be made of aliphatic or aromatic diisocyanates, or of higher-functionality aliphatic or aromatic isocyanates, where these have from 2 to 6, preferably from 2 to 4, and particularly preferably 2 or 3, reactive isocyanate groups. Preferred diisocyanates used are tolylene 2,4-diisocyanate, tolylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate, xylylene diisocyanate and hexamethylene diisocyanate.

Among these, particular preference is given to diphenylmethane 2,2'-, 2,4'- and 4,4'-diisocyanates, and also to hexamethylene diisocyanate. Hexamethylene diisocyanate is very particularly preferred. The isocyanates, in particular the latter diisocyanates, may generally also be used in the form of a mixture.

Another possible isocyanate having three reactive isocyanate groups is tri(4-isocyanatophenyl)methane. Other suitable isocyanate components having a number of reactive isocyanate groups are the products of addition of diisocyanates onto polyhydric alcohols or polybasic amines. Examples of suitable compounds are the abovementioned diisocyanates and the abovementioned diols, dihydroxy compounds containing ether groups and the abovementioned tri- and polyols. Other suitable isocyanates having a number of reactive isocyanate groups are the products of addition of diisocyanates, in particular the abovementioned diisocyanates, onto the abovementioned di- and polyamines. Preferred isocyanate components having a number of reactive isocyanate groups are the isocyanurates and biurets, preferably isocyanurates, of diisocyanates, preferably of aliphatic diisocyanates. Particularly preferred isocyanates which have a number of reactive isocyanate gorups include isocyanurates which derive from alkylene diisocyanates or from cycloalkylene diisocyanates, where these compounds have from 2 to 20 carbon atoms, preferably from 3 to 12 carbon atoms, for example isophorone diisocyanate. The alkylene diisocyanates here may be either linear or branched. Particular preference is given to isocyanurates based on n-hexamethylene diisocyanate.

The amount used of the isocyanate component, if this is used concomitantly, is generally from 0.01 to 5 mol %, preferably from 0.05 to 4 mol %, based on the total of the molar amounts of the components of A and B.

The isocyanate component may also comprise subordinate amounts, e.g. up to 5% by weight, based on the total weight of the isocyanate component, of urethione groups, for example for capping the isocyanate groups.

The copolyesters of the novel molding compositions may moreover contain divinyl ethers. The divinyl ethers used may generally be any of the usual and commercially available divinyl ethers. It is preferable to use 1,4-butanediol divinyl ether, 1,6-hexanediol divinyl ether or 1,4-cyclohexanedimethanol divinyl ether, or mixtures of these.

The amount used of the divinyl ethers is preferably from 0.01 to 5% by weight, in particular from 0.2 to 4% by weight, based on the total weight of A and B.

The biodegradable thermoplastic molding compositions preferably comprise, based on the total weight of the thermoplastic molding composition, at least 30% by weight, particularly preferably at least 50% by weight, and in particular at least 70% by weight, of at least one biodegradable thermoplastic copolyester.

According to the invention, the biodegradable thermoplastic molding compositions comprise, based on the total weight of the thermoplastic molding composition, from 0.01 to 15% by weight, preferably from 0.1 to 10% by weight, in particular from 0.5 to 8% by weight, particularly preferably from 1 to 7% by weight, and very particularly preferably from 1.5 to 6% by weight, of at least one hydrophobicized phyllosilicate.

For use as a film material or fiber material the biodegradable thermoplastic molding compositions preferably comprise, based on the total weight of the thermoplastic molding composition, from 0.01 to 10% by weight, particularly preferably from 0.02 to 8% by weight, and in particular from 0.1 to 6% by weight, of at least one hydrophobicized phyllosilicate.

For use of the biodegradable thermoplastic molding compositions in injection molding, these preferably comprise, based on the total weight of the thermoplastic molding composition, from 0.01 to 15% by weight, particularly preferably from 1 to 12% by weight and in particular from 2 to 8% by weight, of at least one hydrophobicized phyllosilicate.

Phyllosilicates are generally silicates in which the $SiO_4$ tetrahedra have been linked in continuous two-dimensional networks. (The empirical formula for the anion is $(Si_2O_5^{2-})_n$). The individual layers have been linked to one another by the cations located between them. The cations mostly present in naturally occurring phyllosilicates are Na, K, Mg, Al and/or Ca.

Examples of synthetic and naturally occurring phyllosilicates are montmorillonite, smectite, illite, sepiolite, palygorskite, muscovite, allevardite, amesite, hectorite, fluorohectorite, saponite, beidellite, talc, nontronite, stevensite, bentonite, mica, vermiculite, fluorovermiculite, halloysite and fluorine-containing synthetic types of mica.

For the purposes of the present invention, a hydrophobicized phyllosilicate is a phyllosilicate which has been reacted with a hydrophobicizer to increase the distances between the layers and to achieve a polarity of similar nature to that of the polymer. Increasing the distances between the layers in this way and/or altering the polarity, where this extends to the breaking-open of the lattice of the mineral, is also termed delamination. The layer thicknesses (mineral layer+hydrophobicizer) in silicates of this type after delamination are usually from 5 to 100 Å, preferably from 5 to 50 Å and in particular from 8 to 20 Å. The hydrophobicization generally takes place prior to preparation of the novel molding compositions.

The layers are further separated by subsequent mixing, e.g. by compounding the hydrophobicized phyllosilicate with copolyesters, and in the molding compositions the resultant distance between the layers is preferably at least 30 Å, in particular at least 40 Å. Another way of preparing the novel biodegradable thermoplastic molding compositions is for the hydrophobicized phyllosilicate to be present when at least some of the components constituting the copolyesters and/or at least partial quantities of the components constituting the copolyesters are copolymerized.

In the molding composition, the distance between the layers in the hydrophobicized phyllosilicate is preferably from 5 to 200 Å, in particular from 35 to 150 Å and particularly preferably from 45 to 100 Å.

Suitable organic hydrophobicizers derive from oxonium, ammonium, phosphonium or sulfonium ions, which may have one or more organic radicals. It is preferable for at least one organic radical, in particular one or two organic radicals, to have been selected from the group consisting of hydrocarbons having more than 12 carbon atoms.

These organic hydrophobicizers replace the cations in the phyllosilicates. The desired distances between the layers and the polarity can be established via the type of organic radical used, and these depend on the type of the respective monomer or polymer into which the phyllosilicate is to be incorporated.

There may be full or partial exchange of the metal ions, preferably full exchange. The amount of exchangeable metal ions is usually given in milliequivalents (meq) per 100 g of phyllosilicate and termed the ion-exchange capacity.

Prior to hydrophobicization the phyllosilicate preferably has a cation-exchange capacity of at least 50 meq/100 g, in particular at least 60 meq/100 g and particularly preferably from 80 to 130 meq/100 g.

Examples of suitable hydrophobicizers are those of the formula VI and/or VI':

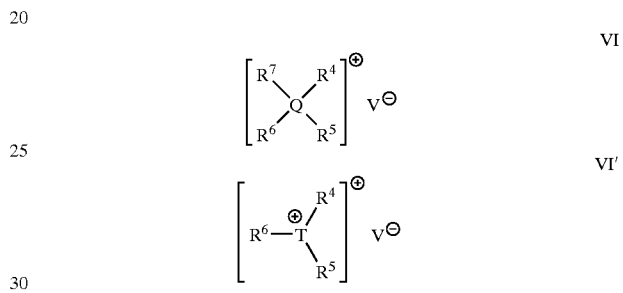

where:
$R^4$, $R^5$, $R^6$, $R^7$, independently of one another, are hydrogen or a straight-chain or branched, saturated or unsaturated, hydrocarbon radical having from 1 to 40 carbon atoms, preferably from 1 to 20 carbon atoms, or
$R^4$ and $R^5$, together with Q, are a nonaromatic heterocyclic radical having from 5 to 10 carbon atoms, or
$R^4$, $R^5$ and $R^6$, together with Q, are a heteroaromatic radical having from 5 to 10 carbon atoms, where the hydrocarbon radicals may, if desired, have one, two or three substituents selected independently from the group consisting of hydroxyl, alkoxy and aryl, and
Q is phosphorus or nitrogen,
T is oxygen or sulfur, and
$V^\ominus$ is an anion or an anion equivalent.

Suitable anions ($V^\ominus$) derive from protonic acids, in particular mineral acids, and preferred anions are halides, such as chloride, bromide, fluoride or iodide, and also sulfate, hydrogensulfate, sulfonate, (di)hydrogenphosphate, phosphate, phosphonate, phosphite and carboxylate, and in particular acetate.

Examples of suitable ions are ammonium ions which have a hydrocarbon radical having from 10 to carbon atoms and three other radicals selected independently form the group consisting of hydrogen, $C_1$–$C_4$-alkyl and $C_1$–$C_4$-hydroxyalkyl.

Examples of preferred alkylammonium ions are laurylammonium, myristylammonium, palmitylammonium, stearylammonium, pyridinium, octadecylammonium, monomethyloctadecylammonium, dimethyloctadecylammonium and stearylbishydroxyethylmethylammonium ions, and an example of a preferred compound is stearylbishydroxyethylmethylammonium dimethyl sulfate.

Examples of suitable phosphonium ions are dicosyltrimethylphosphonium, hexatriacontyltricyclohexylphosphonium, octadecyltriethylphosphonium, dicosyltriisobutylphosphonium, methyltrinonylphosphonium, ethyltrihexadecylphosphonium, dimethyldidecylphosphonium, diethyldioctadecylphosphonium, octadecyldiethylallylphosphonium, trioctylvinylbenzylphosphonium, dioctyldecylethylhydroxyethylphosphonium, docosyldiethyldichlorobenzylphosphonium, octylnonyldecylpropargylphosphonium, triisobutylperfluorodecylphosphonium, eicosyltrihydroxymethylphosphonium, triacontyltriscyanoethylphosphonium and bis(trioctyl)ethylenediphosphonium.

Other suitable hydrophobicizers are described in WO 93/4118, WO 93/4117, EP-A 398 551 and DE-A 36 32 865, inter alia.

Particularly suitable hydrophobicizes for the hydrobicized phyllosilicates are trialkylammonium salts and tetraalkylammonium salts.

The phyllosilicates used as starting materials are generally hydrophobicized in the form of a suspension. The preferred suspension medium is water, if desired mixed with alcohols, in particular with lower alcohols having from 1 to 3 carbon atoms.

It can be advantageous to use a hydrocarbon, such as heptane, together with the aqueous medium, since the hydrophobicized phyllosilicates are usually more compatible with hydrocarbons than with water.

Other examples of suitable suspension media are ketones and hydrocarbons. Preference is usually given to a water-miscible solvent. When the hydrophobicizer is added to the phyllosilicate, ion exchange takes place, as a result of which the phyllosilicate usually becomes more hydrophobic and precipitates from the solution. The metal salt produced as by-product of the ion exchange is preferably water-soluble, and the hydrophobicized phyllosilicate can therefore be isolated as a crystalline solid by filtration, for example.

The ion exchange is substantially independent of the reaction temperature. The temperature is preferably above the crystallization point of the medium and below its boiling point. In the case of aqueous systems it is from 0 to 100° C., preferably between room temperature (about 20° C.) and 80° C.

After hydrophobicization, the distance between the layers in the phyllosilicates is from 5 to 100 Å, preferably from 5 to 50 Å and in partiuclar from 8 to 20 Å. The distance between the layers is usually the distance from the lower boundary of the upper layer to the upper boundary of the lower layer. The length of the lamellae is usually up to 2000 Å, preferably up to 1500 Å.

Besides the hydrophobicized phyllosilicates, the biodegradable copolyesters may comprise additives which may be incorporated during the polymerization procedure at one stage or another, or subsequently, for example into a melt of the biodegradable copolyesters. Examples of additives are stabilizers, neutralizing agents, lubricants, release agents, antiblocking agents, nucleating agents, dyes, in particular fluorescent dyes, and fillers.

Based on the biodegradable copolyester, it is possible to add up to 70% by weight of additives to the molding compositions. Depending on the nature of the application, the molding compositions may comprise, for example, from 0.1 to 50% by weight of additives, or from 1 to 30% by weight of additives. Examples of suitable additives are particulate fillers which have not been hydrophobicized, for example carbon black, lignin powder, iron oxides, clay minerals, ores, calcium carbonate, calcium sulfate, barium sulfate and titanium dioxide, and also auxiliaries, such as stabilizers, e.g. tocopherol (vitamin E), organic phosphorus compounds, mono-, di- and polyphenols, hydroquinones, diarylamines, and thio ethers. An example of a nucleating agent is talc. Lubricants and mold-release agents based on hydrocarbons, on fatty alcohols, on higher carboxylic acids, on metal salts of higher carboxylic acids, such as calcium stearate or zinc stearate, or on montan waxes, may also be present as additives. These stabilizers, etc., are described in detail in Kunststoff-Handbuch, Vol. 3/1, Carl Hanser Verlag, Munich, 1992, pp. 24–28.

The novel molding compositions may moreover comprise fibrous fillers.

Preferred fibrous fillers are glass fibers, carbon fibers, aramid fibers and potassium titanate fibers, and particular preference is given to glass fibers, in particular of E glass. These may be used in the form of the commercially available chopped glass or rovings.

To improve compatibility with the thermoplastic, the fibrous fillers may have been pretreated with a size. Suitable sizes derive, for example, from organic compounds with silane, (poly)urethane or epoxy functionality. Among the silane sizes, aminosilane sizes are preferred. It is also possible to use mixtures of silane compounds, (poly)urethane compounds and/or epoxy compounds as a sizing material. Suitable sizing materials may also derive from polyfunctional compounds, e.g. from aminosilanes having (poly)urethane functionality or having epoxy functionality. Preferred silane sizes are aminopropyltrimethoxysilane, aminobutyltrimethoxysilane, aminopropyltriethoxysilane, aminobutyltriethoxysilane and the corresponding silanes which contain a glycidyl substituent.

The amounts of the silane compounds generally used for surface-coating are from 0.05 to 5% by weight, preferably from 0.5 to 1.5% by weight and in particular from 0.8 to 1% by weight, based on the fibrous fillers.

An example of a lubricant is erucamide. Examples of pigments which may be used are carbon blacks and titanium oxide. Rutile and anatase are used industrially, and may, if desired, have been coated with metal oxides, e.g. aluminum oxides, silicon oxides, oxides of zinc, or with siloxanes. For the purposes of the present invention, carbon blacks are microcrystalline, fine-particle carbon blacks (cf. Kunststofflexikon, $7^{th}$ Edn., 1980). Examples of suitable carbon blacks are furnace blacks, acetylene blacks, gas blacks, and also the thermal blacks prepared using the action of heat. The particle sizes are preferably from 0.01 to 0.1 $\mu$m, and the surface areas from $10^2$ to $10^4$ m$^2$/g (BET/ASTM D 3037) with DBP absorptions of from $10^2$ to $10^3$ ml/100 g (ASTM D 2414).

To prepare the novel molding composition, the hydrophobicized phyllosilicate, in particular a phyllosilicate hydrophobicized in the above manner, may then be mixed and/or homogenized, in suspension or as a solid, with the copolyester. Processes suitable for the mixing and/or homogenization are known to the skilled worker and include kneading, stirring and extruding. In a preferred embodiment, the novel molding compositions may be obtained by mixing and/or homogenizing at least one copolyester with at least one hydrophobicized phyllosilicate by well known processes, e.g. by extrusion, preferably at from 130 to 260° C. and with preference at from 140 to 220° C. This mixing and/or homogenization is termed compounding. If desired, the hydrophobicized phyllosilicate, in particular a phyllosilicate hydrophobicized in the above manner, may be mixed and/or homogenized in suspension or as a solid with at least some and/or at least a partial amount of the components constituting the copolyester, forming a copolyester comprising the hydrophobicized phyllosilicate or, respectively, a molding composition comprising the hydrophobicized phyllosilicate. The copolymerization of the components may also be carried out in a usual manner in the presence of the hydrophobicized phyllosilicate. It is sometimes possible to prepare molding compositions with particularly advantageous properties by carrying out the copolymerization of the components constituting the copolyester at least to some extent in the presence of the hydrophobicized phyllosilicate.

An appropriate way of preparing the novel molding compositions is to mix and/or homogenize the constituents, preferably at from 220 to 260° C., in the usual mixing equipment, such as kneaders, Banbury mixers or single-screw extruders, preferably twin-screw extruders. To obtain a very homogeneous molding composition intensive and thorough mixing is needed. The sequence of mixing the constituents may be varied, and two or, if desired, three of the constituents may be premixed, or all of the constituents may be mixed together, and the constituents here may be homogenized either as solids or else in suspension.

The present invention also provides a process for preparing molding compositions as described above, where at least one copolyester and at least one hydrophobicized phyllosilicate, and, if desired, other additives, are mixed, and are homogenized with softening or melting, at least of the copolyester.

The present invention also provides a process for preparing molding compositions as described above, where at least some of the components constituting the copolyester, preferably component B, and, if desired, at least some of the other additives, are mixed and/or homogenized with the hydrophobicized phyllosilicate, and the remainder of the components, and if appropriate at least one further portion of the other additives, are added and the resultant mixture is reacted, forming a copolyester comprising the phyllosilicate.

The novel molding compositions may be further processed in a known manner, e.g. by extrusion and/or injection molding. The novel molding compositions generally comprise the usual additives matched to the further processes used. Additives of this type are known to the skilled worker.

The films produced from the novel molding compositions have at least comparable tear strength, together with increased yield stress and improved or comparable elongation at break. The inventive addition of phyllosilicate has hardly any effect on the composting of the films. There is also no reduction in service life.

The novel molding compositions differ from unfilled molding compositions in permitting injection molding. Here, too, an improvement in yield stress and an improvement in modulus of elasticity are noted, without any significant reduction in tear strength. There is no adverse effect on composting.

The moldings, films and fibers obtained from the novel molding compositions are novel and are therefore also part of the subject matter of the present application.

Examples are used below to illustrate the invention in greater detail.

EXAMPLES

I. Preparation of the Molding Compositions by Mixing Copolyester and Hydrophobicized Phyllosilicate (Compounding)

Ia The copolyester was prepared in a stirred reactor in an atmosphere of nitrogen. 4700 g of 1,4-butanediol, 7000 g of adipic acid and 10 g of tetrabutyl orthotitanate (TBOT) were reacted at from 230 to 240° C. in the reactor. Once most of the water formed during the reaction had been distilled off, 7620 g of dimethyl terephthalate, 3900 g of 1,4-butanediol and a further 10 g of TBOT were added and the mixture heated to 180° C. During this procedure, the methanol formed during the transesterification reaction was distilled off. The mixture was heated to 230° C. within a period of 2 hours and 2 g of phosphorous acid were added, and the reactor evacuated to a pressure of about 1 mbar within the period of one hour. Condensation was continued for two hours at 250° C. and about 1 mbar, and the excess of 1,4-butanediol used was distilled off.

Ib The copolyester prepared as above was compounded in a Werner & Pfleiderer ZSK 25 twin-screw extruder at 160° C. with the amounts given in the table of either (inventive examples E1 to E3) a montmorillonite (Cloisite 30 A from Southern Clay Products) hydrophobicized with stearylbishydroxyethylmethylammonium dimethyl sulfate or (comparative examples CE2 to CE5) chalk, and the resultant molding composition was pelletized.

II. Preparation of a Molding Composition by Polycondensing the Components of the Copolyester in the Presence of the Hydrophobicized Phyllosilicate (In-Situ Preparation of the Molding Composition)

The molding composition was prepared in a stirred reactor under an atmosphere of nitrogen. 1100 g (=6%) of a montmorillonite (Cloisite 30 A from Southern Clay Products) hydrophobicized with stearylbishydroxyethylmethylammonium dimethyl sulfate were swollen in 4700 g of 1,4-butanediol at 80° C. in the reactor. 7000 g of adipic acid and 10 g of tetrabutyl orthotitanate (TBOT) were then added and reacted at from 230 to 240° C. Once most of the water formed during the reaction has been distilled off, 7620 g of dimethyl terephthalate, 4700 g of 1,4-butanediol and a further 10 g of TBOT were added and the mixture heated to 180° C. During this process the methanol formed during the transesterification reaction was distilled off. The mixture was heated to 230° C. within a period of 2 hours and 2 g of phosphorous acid were added, and the reactor evacuated to a pressure of about 1 mbar within a period of one hour. The condensation was continued for two hours at 250° C. and about 1 mbar, and the excess 1,4-butanediol used was distilled off.

III. Production of Moldings by Injection Molding

IIIa The molding compositions obtained under I. and II. were melted at 160° C. and injection molded. The results of mechanical property tests and biodegradability determination are given in Table 1. Biodegradability was determined as follows: weighed specimens were buried in screened compost in sealable containers. The containers were sealed and stored for 8 and, respectively, 12 weeks at 56° C. The specimens were then excavated, the compost was rinsed off with water, and the specimens were dried for 16 h at about 30° C. in vacuo, and then reweighed.

IIIb For comparison, injection molding experiments were carried out with the uncompounded copolyester prepared as described under Ia, and with a copolyester prepared as described under Ia which had been compounded with a conventional filler (chalk) giving a filler level of 15, 30, 45 and 60% by weight. In no case was it possible to obtain test moldings to ISO 527, since the test moldings could not be removed from the injection mold without becoming damaged.

IV. Production of Films

IVa The molding compositions obtained under I. and II. were melted at 160° C. and processed in the standard manner to give a film product of 100 μm thickness. The results of mechanical tests and biodegradability determination are given in Table 2. Service lives were determined as follows: 50 g of a model organic-waste mixture of finely chopped carrots, potatoes, cabbage, garlic, peppers, onions, apples, bananas, pears, oranges, kiwi fruit and lemons was placed in a bag of dimensions 8×2 cm made from the 100 μm films, and each bag sealed by welding. The juncture at which the first cracks or holes arose in the film was determined.

IVb In comparative experiments, the film product as described above was produced with the uncompounded copolyester prepared as described in Ia, and with copolyester prepared as described in Ia and compounded with a conventional filler (chalk) giving a filler level of from 0 to 60% by weight (comparative examples CE1 to CE5). The results of mechanical property tests and biodegradability determination are given in Table 2.

TABLE 1

Biodegradability of injection moldings

| Preparation | HP[1] [% by weight] | Mineral content[2] | Yield stress[3] [MPa] | Tear strength[4] [MPa] | Modulus of elasticity[5] | Weight loss after 8 weeks[6] [%] | Weight loss after 12 weeks[6] [%] |
|---|---|---|---|---|---|---|---|
| E5 Ia/Ib/IIIa | 2.0 | 1.5 | 7.8 | 17.4 | 89 | 4.63 | 10.23 |
| E6 Ia/Ib/IIIa | 4.0 | 3.0 | 8.6 | 17.5 | 135 | 4.25 | 10.29 |
| E7 Ia/Ib/IIIa | 6.0 | 4.5 | 9.5 | 16.8 | 177 | 3.65 | 9.16 |
| E8 II/IIIa | 6.0 | 4.5 | 10.3 | 18.4 | 183 | n. d. | n. d. |

[1]Hydrophobicized phyllosilicate Cloisite 30 A (Southern Clay Products)
[2]determined after ashing the moldings
[3]to ISO 527-2
[4]to ISO 527-2
[5]to ISO 1133 eU
[6]Averages from two injection moldings in each case
n. d. not determined

TABLE 2

Mechanical properties and biodegradability of films

| Example | Preparation | HP[1] [%] | FM[2] [%] | Yield stress [N/mm²][3] longitudinal | Yield stress [N/mm²][3] transverse | Tear strength [N/mm²][3] longitudinal | Tear strength [N/mm²][3] transverse | Elongation at break [%][3] longitudinal | Elongation at break [%][3] transverse | Biodegradability: Weight loss in % after 14 days | 21 days | 28 days | Service life [days] |
|---|---|---|---|---|---|---|---|---|---|---|---|---|---|
| CE1 | Ia/IVb | 0 | 0 | 5.6 ± 0.3 | 3.9 ± 0.5 | 32.6 ± 2.0 | 19.1 ± 3.9 | 600 ± 30 | 1020 ± 90 | — | 23 ± 4 | — | 38 ± 4 |
| E1 | Ia/Ib/IVa | 2 | 0 | 7.6 ± 0.8 | 4.7 ± 0.6 | 37.7 ± 7.0 | 18.1 ± 4.3 | 670 ± 20 | 920 ± 70 | 18 ± 6 | 35 ± 8 | 54 ± 4 | 36 ± 5 |
| E2 | Ia/Ib/IVa | 4 | 0 | 6.9 ± 0.7 | 5.1 ± 0.8 | 30.4 ± 5.3 | 21.8 ± 4.3 | 690 ± 50 | 930 ± 60 | 20 ± 1 | 27 ± 6 | 50 ± 4 | 38 ± 6 |
| E3 | Ia/Ib/IVa | 6 | 0 | 6.4 ± 0.8 | 5.5 ± 1.0 | 29.1 ± 4.0 | 21.2 ± 2.8 | 640 ± 20 | 950 ± 50 | 18 ± 1 | 32 ± 3 | 51 ± 3 | 35 ± 4 |
| E4 | II/IVa | 6 | 0 | 7.4 ± 0.6 | 4.3 ± 0.4 | 33.9 ± 3.9 | 20.1 ± 4.1 | 610 ± 50 | 980 ± 50 | 18 ± 3 | n.d. | 50 ± 4 | 36 ± 4 |
| CE2 | Ia/IVb | 0 | 15 | 5.7 ± 0.3 | n.d. | 22.5 ± 3.1 | n.d. | 550 ± 40 | n.d. | n.d. | 25 ± 7 | n.d. | 33 ± 8 |
| CE3 | Ia/IVb | 0 | 30 | 6.1 ± 0.6 | n.d. | 18.8 ± 4.2 | n.d. | 480 ± 50 | n.d. | n.d. | 39 ± 4 | n.d. | 22 ± 5 |
| CE4 | Ia/IVb | 0 | 45 | 6.7 ± 0.8 | n.d. | 13.9 ± 3.0 | n.d. | 410 ± 70 | n.d. | n.d. | 52 ± 9 | n.d. | 19 ± 7 |
| CE5 | Ia/IVb | 0 | 60 | 9.6 ± 1.5 | n.d. | 10.8 ± 4.1 | n.d. | 310 ± 90 | n.d. | n.d. | 100 | n.d. | 12 ± 3 |

[1]Hydrophobicized phyllosilicate Cloisite 30 A (Southern Clay Products)
[2]Filler: chalk
[3]Determined to DIN;
n.d. = not determined

What is claimed is:

1. A biodegradable thermoplastic molding composition comprising, based on the total weight of the thermoplastic molding composition,
   a) at least 30% by weight of at least one biodegradable thermoplastic copolyester which contains at least three components selected from a group consisting of components A and B, and optionally contains one or more further components C, wherein the copolyester comprises
      as component A, from 30 to 95 mol % of at least one aliphatic dicarboxylic acid and from 5 to 70 mol % of at least one aromatic dicarboxylic acid, wherein the dicarboxylic acids are employed in form of the acid, an ester-forming derivative of the acid, or a mixture of the dicarboxylic acids and their ester-forming derivatives, and
      as component B, at least one diol component selected from the group consisting of $C_2$–$C_{12}$ alkianediols and $C_5$–$C_{10}$ cycloalkanediols and mixtures thereof, and
      component C is selected from tri- and polyols, di- and polyamines, amino alcohols, hydroxycarboxylic acids, aminocarboxylic acids, tri- and polycarboxylic acids, bisoxazolines and isocyanates; and
   b) from 0.01 to 15% by weight of at least one hydrophobicized phyllosilicate, and
   c) a copolymer or block copolymer based on lactic acid and polyhydroxyalkanoates.

2. A molding composition as claimed in claim 1, where the distance between the layers in the hydrophobicized phyllosilicate in the molding composition is from 5 to 200 Å.

3. A molding composition as claimed in claim 1, where the phyllosilicate prior to its hydrophobicization has a cation-exchange capacity of at least 50 milliequivalents per 100 g.

4. A molding composition as claimed in claim 1, wherein the hydrophobicized phyllosilicates comprises organic or inorganic cations.

5. A molding composition as claimed in claim 1, where the content of other additives is from 0.1 to 70% by weight, based on the content of copolyester.

6. A process for preparing molding compositions as claimed in claim 1, where at least one biodegradable, thermoplastic copolyester and a copolymer or block copolymer based on lactic acid and polyhydroxyalcanoates and at least one hydrophobicized phyllosilicate are mixed, and are homogenized with softening or melting, at least of the copolyester and the copolymer or block copolymer.

7. A process for preparing molding compositions as claimed in claim 1, where at least some of the components constituting the copolyester are mixed and/or homogenized with the hydrophobicized phyllosilicate and the copolymer or block copolymer based on lactic acid and polyhydroxyalcanoates, the remainder of the components are added, and the resultant mixture is reacted, forming a copolyester comprising the phyllosilicate and the copolymer or block copolymer.

8. A molding, a film or a fiber obtainable from molding compositions as claimed in claim 1.

9. A molding composition as claimed in claim 4, wherein the hydrophobicized phyllosilicate comprises oxonium, ammonium, phosphonium or sulfonium cations which optionally carry one or more organic radicals.

10. A molding composition as claimed in claim 9, wherein the cations optionally carry one or two organic radicals.

11. A molding composition as claimed in claim 1, wherein the hydrophobicized phyllosilicate is obtained by reacting a non-hydrophobicized phyllosilicate with a hydrophobicizer selected from oxonium, ammonium, phosphonium and sulfonium ions which carry at least one organic radical.

12. A molding composition as claimed in claim 1, wherein the ester-forming derivative is a di-$C_1$–$C_6$-alkyl ester or an anhydride of the dicarboxylic acid.

13. A biodegradable thermoplastic molding composition consisting essentially of based on the total weight of the thermoplastic molding composition, from 30 to 99.99% by weight of the at least one biodegradable thermoplastic copolyester, which copolyester contains at least three components selected from the group consisting of components A and B, and optionally contains one or more further components C, wherein the copolyester comprises as component A, from 30 to 95 mol % of at least one aliphatic dicarboxylic acid and from 5 to 70 mol % of at least one aromatic dicarboxylic acid, wherein the dicarboxylic acids are employed in form of the acid, an ester-forming derivative of the acid, or a mixture of the dicarboxylic acids and their ester-forming derivatives and as component B, at least one diol component selected from the group consisting of $C_2$–$C_{12}$ alkanediols and $C_5$–$C_{10}$ cycloalkanediols and mixtures thereof, and component C is selected from the group consisting of tri- and polyols, di- and polyamines, amino alcohols, hydroxycarboxylic acids, aminocarboxylic acids, tri- and polycarboxylic acids, bisoxazolines and isocyanates;

from 0.01 to 15% by weight of the at least one hydrophobicized phyllosilicate;

a copolymer or block copolymer based on lactic acid and polyhydroxyalkanoates, from 0 to 50% by weight of other fillers; and from 0 to 5% by weight of auxiliaries.

* * * * *